OR 3,639,033

United States
Haines

[15] 3,639,033
[45] Feb. 1, 1972

[54] HOLOGRAPHIC DATA REDUCTION WITH PERIODIC DISPERSIVE MEDIUMS AND METHOD OF ORTHOSCOPIC IMAGE RECONSTRUCTION

[72] Inventor: Kenneth A. Haines, Middletown, Del.
[73] Assignee: The Battelle Development Corporation, Columbus, Ohio
[22] Filed: Nov. 12, 1969
[21] Appl. No.: 875,768

Related U.S. Application Data

[63] Continuation-in-part of Ser. No. 809,171, Mar. 21, 1969, which is a continuation-in-part of Ser. No. 730,337, May 20, 1968, abandoned, which is a continuation-in-part of Ser. No. 649,337, June 27, 1967, abandoned.

[52] U.S. Cl. .................................. 350/3.5, 161/3.5
[51] Int. Cl. ............................................. G02b 27/00
[58] Field of Search .................. 350/3.5, 162 SF; 356/106; 96/27 H; 161/2, 3.5

[56] References Cited

UNITED STATES PATENTS 3,449,577  6/1969  Kogelnik .................................. 350/3.5
3,484,147  12/1969  Collier .................................. 350/3.5

OTHER PUBLICATIONS

Rotz et al., Applied Physics Letters, Vol. 8, No. 6, pp. 146–148, March 1966

*Primary Examiner*—David Schonberg
*Assistant Examiner*—Ronald J. Stern
*Attorney*—Woodcock, Phelan & Washburn

[57] ABSTRACT

A method of holography in which the object wavefront is dispersed before reaching the hologram detector for recordation thereon and an image-carrying diffracted wavefront reconstructed from the hologram detector is dispersed in a manner related to the dispersion of the object wave front during the hologram's construction. Several specific techniques are disclosed for reconstructing an orthoscopic (actual) image of the object. A preferred technique for reconstructing an orthoscopic image includes making from such a hologram a second hologram without dispersion of the wave front recorded on the second hologram. Dispersion techniques for reducing the space-spatial frequency product of the information holographically recorded are also disclosed wherein a periodically phase-varying diffusion plate etched on one side thereof is utilized for wave front dispersion.

12 Claims, 22 Drawing Figures

3,639,033

HOLOGRAPHIC DATA REDUCTION WITH PERIODIC DISPERSIVE MEDIUMS AND METHOD OF ORTHOSCOPIC IMAGE RECONSTRUCTION

CROSS-REFERENCES TO RELATED APPLICATIONS

This application is a continuation-in-part of copending patent application, Ser. No. 809,171 filed Mar. 21, 1969, which is a continuation-in-part of copending patent application, Ser. No. 730,337, filed May 20, 1968 and now abandoned, which in turn is a continuation-in-part of patent application, Ser. No. 649,337, filed June 27, 1967 and now abandoned.

BACKGROUND OF THE INVENTION

This invention relates generally to the field of holography and more specifically relates to techniques for reducing the data recorded by a hologram.

The invention of off-axis holography is described by Leith and Upatnieks in the *Scientific American*, June, 1965, pages 25–35, and in their copending patent application Ser. No. 361,977. Briefly described, the off-axis holographic technique includes interfering two coherent beams of light, which are also coherent with each other, at a photosensitive detector and at some finite angle with each other. One of the beams contains in its wavefront the information to be recorded. For instance, one of the beams may be modified by an object. The other beam serves as reference energy and thus the phase and amplitude of the information-carrying wavefront are both recorded on the hologram detector. The information-carrying wavefront is reconstructed from the finished hologram upon its illumination with coherent light in a beam that is physically related to the reference wavefront beam used to construct the hologram. A viewer in the path of this reconstructed information-carrying wavefront is able to observe an image of the original object in full three dimensions as if he were observing the object itself.

For many applications, the amount of data that is recorded in the form of a diffraction pattern upon the photosensitive hologram detector is more than that required to reconstruct therefrom a wavefront with enough information therein to form an adequate image of the object. Furthermore, in many commercial applications of off-axis holography now contemplated it is highly desirable to reduce the amount of data that must be transmitted or stored, thereby reducing the time-bandwidth product of communications transmission system and also reducing the amount of hologram area necessary to record a given amount of information. A specific technique of hologram data reduction is described in the *Proceedings of the IEEE*, Aug. 1967, pages 1512–1513, and *Applied Optics*, June, 1968, Vol. 7, No. 6, pages 1,185–1,189. The technique described in these papers and in the copending patent applications cross-referenced hereinbefore includes dispersing the object information beam prior to its striking the hologram detector for recordation thereon. The relative positions of the object to be recorded, the hologram detector and a dispersion medium therebetween define, in part, the maximum space-spatial frequency products recorded on the hologram, thereby allowing adjustments to reduce this product. Also, the size of the hologram may be made considerably smaller than the size of the dispersion medium. Upon reconstruction of the hologram, a diffracted image-carrying beam is passed back through the same dispersion medium utilized during its construction, thereby to form a data-reduced image of the object originally recorded. The viewing angle of the object image so reconstructed is the same as if a hologram the size of the dispersion medium and substituted therefor in relation to the object was constructed instead of the data-reduced hologram. This technique is essentially one of sampling the total object information and recording the samples. Of course, something must be sacrificed by such a sampling process which results in either reduced reconstructed image resolution or increased noise in a reconstructed image. A desired balance between image resolution degradation and increased background noise may be controlled by controlling the dispersing characteristics of the data-reducing dispersion medium. As the period of phase variation across the dispersion medium increases, the resulting reconstructed image resolution and background noise are reduced. Conversely, as the period of phase variation across the dispersion medium decreases, the reconstructed image will have increased resolution accompanied by increased background noise.

This data-reducing technique by the use of a dispersion medium in an object information carrying wavefront during the construction of a hologram is a form of coding in holography. In a more general sense, such coding may be accompanied by a wide variety of phase and/or intensity varying structures placed in such a wavefront during a hologram construction when the purpose is to record the object information wavefront in a manner that the wavefront may be reconstructed only with knowledge of the specific modulating structure utilized in hologram construction. Upon reconstruction of such a hologram, an image-carrying wavefront diffracted from the hologram is passed back through the same modulating structure to decode the information recorded on the hologram and thereby reconstruct the original object information wave front.

When reconstructing images from such holograms according to ordinary techniques, an image of the dispersion medium or other modulating structure is formed in a diffracted beam. It is at this position that the dispersion medium or modulating structure used in constructing the hologram is repositioned to cancel out its original effect and thereby reconstruct a wavefront corresponding to the object information carrying wave front. In order to so simply reconstruct the desired wave front, the diffracted beam reconstructed from the hologram must be that beam which forms an image of the dispersion medium or other modulating structure in real space so that the structure may be realigned with the image. The result is that the reconstructed replica of the original object information carrying beam is traveling in the wrong direction which makes images formed therein appear to an observer to be pseudoscopic; that is, points of the original object scene that appeared to be at a far distance are now the nearest points in the image reconstructed thereof while near points of the object scene appear to be as distant points in the reconstructed image. It is desirable in most applications to be able to reconstruct a replica of the object information carrying wavefront traveling in the proper direction to form an orthoscopic (actual) image of the original object scene recorded.

Therefore, it is a primary object of the present invention to provide techniques whereby orthoscopic images of an object may be reconstructed from a hologram constructed with a modulating structure positioned between the object scene and the hologram detector during its construction.

It is a more specific object of the present invention to provide a technique for reconstructing orthoscopic images from a hologram so constructed wherein the modulating structure is a dispersion medium positioned in a manner relative to the object in the hologram detector to reduce the data recorded on the hologram detector.

It is a further object of the present invention to provide techniques for constructing a copy hologram capable of reconstructing an orthoscopic image of the original object scene recorded on a master hologram with a modulating structure positioned between the object scene and the hologram detector.

It is additionally an object of the present invention to provide an improved dispersion medium for use in such a modulating structure for construction of a data-reduced hologram.

SUMMARY OF THE INVENTION

These and additional objects of the present invention are accomplished by any one of several alternate holographic construction and reconstruction techniques which provide a reconstructed diffracted beam which forms in real space an image of the modulating structure utilized during construction of the hologram as well as being capable of forming an orthoscopic image of the original object scene recorded. According to one aspect of the present invention, a hologram is recorded and a diffracted beam reconstructed therefrom in a manner that an actual image of the modulating structure is formed in a diffracted beam reconstructed from the hologram with a conjugate of the original modulating structure placed coincident with said image, thereby to form an orthoscopic image of the object. By "conjugate" modulating structures is meant to refer to two structures having phase variation functions thereacross which are substantially of opposite signs.

According to another aspect of the present invention, a first hologram is constructed of the object information directly from the object scene to be recorded and a second hologram is constructed from a conjugate diffracted wave front of the first hologram. It is the second hologram from which a diffracted beam that is a conjugate of the wave front recorded thereon is formed in which an image of a modulating structure is formed in real space so the effect of a modulating structure may be cancelled by aligning coincident therewith a modulating structure.

In what appears to be the optimum embodiment of the present invention for most applications wherein an orthoscopic image of an object scene holographically recorded is required, both of these aspects of the present invention are utilized. A first hologram is constructed from an object scene with a modulating structure placed between the object scene and the hologram detector. This first hologram is then illuminated in a manner to reconstruct a conjugate diffracted order beam in which a pseudoscopic image of the modulating structure is reconstructed in real space. A second hologram is constructed of this diffracted order light beam at a position downstream from the modulating structure image. The second hologram is then illuminated in a manner to reconstruct a diffracted order light beam that is a conjugate of the beam recorded thereon to form an actual image of the modulating structure. A conjugate of the modulating structure is aligned within this beam coincident with its actual image to reconstruct an orthoscopic image of the object scene originally recorded. The second hologram is made without adding another modulating structure in the wavefront recorded thereon which has been diffracted from the first hologram, thereby avoiding added loss of information which may be caused by scattering of light by the modulating structures. Also, a lens may be added during either the construction of the first hologram or during the construction of the second hologram to appropriately gather light or serve some other function without the lens needing to be of high optical quality. The same or similarly constructed lens may be reinserted in a later step in producing a reconstructed image to cancel out any aberrations present therein.

A very useful application of the techniques of the present invention, especially those of the optimum embodiment thereof, is in the field of large-screen three-dimensional movies wherein the object scene recorded on a holographic movie and the images reconstructed therefrom are much larger than could possibly be handled by basic holography techniques alone. By such basic techniques, each frame of the holographic movie would have to be at least as large as the object scene to be recorded with a large number of such holograms being shown each second. This would involve an enormous amount of photographic film which makes such a holographic movie impractical. However, with the techniques of data reduction wherein the modulating structure referred to herein is a dispersing medium, the size of each hologram of a holographic movie may be made a significant number of times smaller than the object scene itself. Orthoscopic images of the object scene are required to be reconstructed and the necessity, according to one aspect of the present invention, of constructing a second hologram in order to obtain such a reconstructed image is not really an added step since a large number of copies would typically be made of a master holographic movie anyway.

Another application of the techniques of the present invention include data reduction by the use of a dispersive medium as the modulating structure herein for the purpose of reducing the spatial frequency of the information in its holographic form so that it may be transmitted over electronic circuits having a bandwidth less than that required to transmit holographic information without data reduction.

To better understand the present invention, reference should be had to the following detailed description of its preferred embodiments with reference to the drawings. The invention is described in its preferred embodiments with a modulating structure of the type to reduce the amount of data holographically recorded because this appears to be the preferred application of the inventive concepts but should not be taken as a limitation of this invention which finds applicability whenever a hologram is constructed with a modulating structure positioned between the object to be recorded and the hologram detector.

DESCRIPTION OF THE PREFERRED EMBODIMENT

Figure 1:
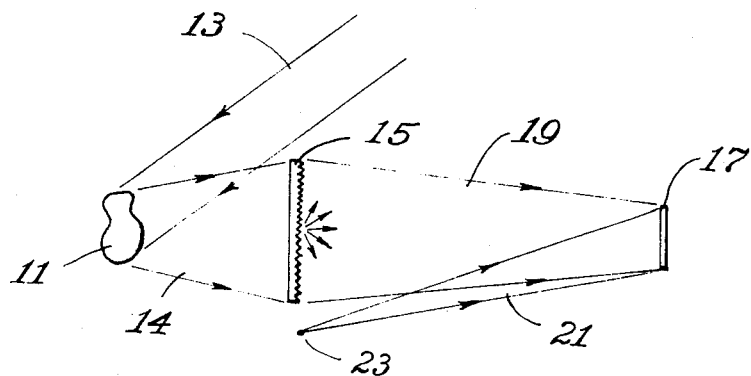
FIGS. 1 and 2 illustrate the construction and reconstruction, respectively, of a data-reduced hologram.

Referring to FIG. 1, a basic technique of constructing a data reduced hologram is illustrated. An object 11 to be recorded is illuminated with a coherent light beam 13 from a convenient source such as a laser (not shown). The object reflects and diffracts this light to form an object information carrying beam 14. A dispersion medium 15 is chosen to have an area and position relative to the object 11 to give a field of view through an area occupied by the dispersive medium that is the field of view desired of the reconstructed image. Each ray of light of the object information carrying beam 14 is dispersed over a wide angle by the dispersive medium 15. The dispersive medium may be, for instance, a piece of ground glass which refracts a light ray an angle that is a random function of position on the dispersive medium. A preferred medium for most applications is one imparting a periodically varying phase thereacross, as discussed hereinafter.

A hologram detector 17 is positioned in a dispersed object information carrying beam 19. A reference beam 21 which is coherent with the object-illuminating beam 13 is directed against the hologram detector 17 for interference with the dispersed beam 19. It is the interference pattern formed by these two intersecting beams that is recorded on the photosensitive detector 17. It will be noted that the reference beam 21 appears to originate from a substantially point source 23 which lies substantially in the plane of the dispersive medium 15. This is preferred for most applications because of the angle of interference between the dispersed beam 19 and the reference beam 21 may be made very small and also because a dispersive medium is more easily positioned properly in a reconstructed wavefront diffracted from the hologram. However, it is to be understood that this is not necessary for practicing the present invention.

The data recorded on hologram detector 17 may be reduced by either positioning the detector further from the dispersive medium 15 then the dispersive medium is from the object, or by making the area of the hologram detector 17 less than the area of the dispersive medium 15, or both. What is done in any specific application depends on a number of factors including the type of data reduction that is desired. If it is desired in a particular application only to reduce the spatial frequency of the information recorded on the hologram detector 17, the distance between the detector and the dispersive medium 15 is made significantly greater than the distance between the object and the dispersive medium. Alternatively, this separation between the dispersive medium and the detector may effectively be obtained by the use of an appropriate lens placed therebetween. That part of the dispersed object information carrying beam 19 that is recorded on the hologram detector 17 is thereby limited in range of spatial frequencies. For other applications, such as in constructing a holographic movie, it is more important that the size of the hologram detector 17 be significantly smaller than the size of the dispersive medium 15.

Factors to be considered in designing an optimum structure of the type having prismlike surface undulations for the dispersion medium 15, whether designed to impart a random or periodic phase variation across a light beam passing therethrough, are described in the copending patent applications, Ser. No. 730,337 and 809,171 cross-referenced hereinbefore, of which the present application is a continuation-in-part, in conjunction with FIGS. 6 and 7 thereof. These factors are also described in the aforementioned *Applied Optics* article of June, 1968, pages 1,185–1,189.

Figure 2:
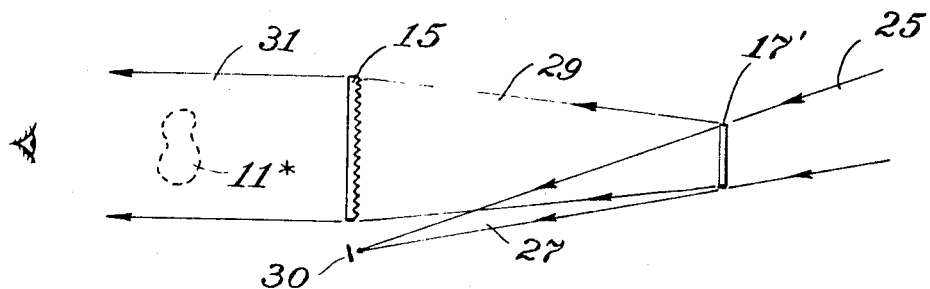

Referring to FIG. 2, a hologram 17' constructed by the technique described with respect to FIG. 1 is illuminated with a coherent reconstructing light beam 25 from the opposite side of the hologram from that which was illuminated during its construction. Furthermore, the reconstructing light beam 25 is given a curvature opposite to that of the reference beam 21 utilized in the hologram's construction. The light 27 undiffracted by the hologram 17' is conveniently blocked by a spatial filter 30. The diffracted beam 29 is the conjugate of the recorded dispersed beam 19 and contains information of the dispersive medium 15 and the object 11. At a position in the diffracted beam 29 where an image of the dispersion medium 15 comes to focus, the dispersion medium is replaced which has the effect of cancelling out information of the dispersion medium to leave an object image carrying beam 31 in which an image 11' is formed and may be observed by a light-sensitive means, such as a human eye, positioned in the beam 31.

The illumination of the hologram 17' upon reconstruction thereof as shown in FIG. 2 is accomplished in a manner to reconstruct an image of the dispersion medium 15 in real space so that the dispersion medium may be repositioned coincident with its image. The image of the dispersion plate so reconstructed is pseudoscopic, thereby having a phase function that is the conjugate of the phase function of the dispersion medium 15. This is why the effect of the dispersion medium is cancelled out upon repositioning of the original dispersion medium coincident with an image thereof. The image 11' of the object 11 is also pseudoscopic which is generally undesirable for three-dimensional reconstructions but for applications with two-dimensional objects, such as diffusely illuminated film transparencies, is of little concern. The reconstructed object information carrying beam 31 is the counterpart of the object information carrying beam 14 except they are conjugates of one another and the information contained in the reconstructed beam 31 is reduced somewhat because of the sampling which results from use of a dispersion medium.

Figure 3:
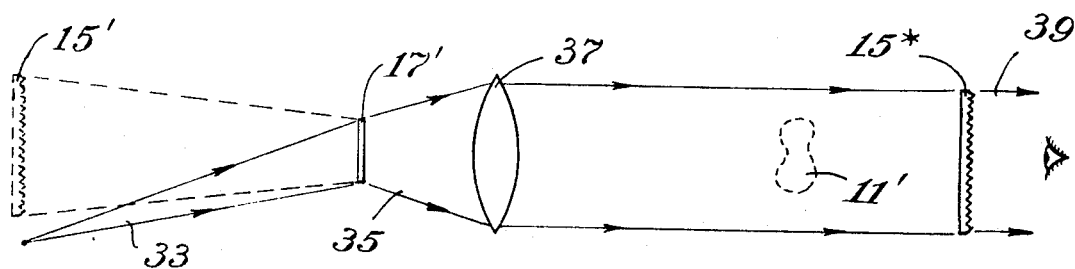
FIG. 3 shows a modification wherein an orthoscopic image may be viewed directly.

Referring to FIG. 3, an improved method of reconstructing an image from the hologram 17' is illustrated. A reconstructing light beam 33 is given the same curvature as the reference beam 21 used in constructing the hologram and is directed against the hologram 17' from the same direction as it was illuminated during its construction. This method of reconstruction forms in a diffracted beam 35 an orthoscopic image 15' which appears to lie behind the hologram 17' (virtual image). If the image 15' is formed in real space, the effect of the dispersion medium 15 may be cancelled out by placing coincident with the image 15' a related dispersion medium. An optical system represented by a lens 37 is positioned in the diffracted beam 35 to bring the image 15' into real space wherein a dispersion medium 15* may be placed coincident therewith to form a wavefront 39 in which an orthoscopic image 11' of the object 11 may be viewed. The imaging system represented by the lens 37 may be one of a variety of systems involving very complex optics and preferably takes the form of a unit telescope. The function of the optical system represented by the lens 37 is wavefront image very accurately the dispersion medium image wavefront into real space. The dispersion medium 15* is not the same dispersion medium 15 as was utilized in the reconstructing method of FIG. 2 but is instead a conjugate thereof. The dispersion medium image 15' transferred into real space by the optical system represented by the lens 37 is orthoscopic, thereby making it necessary to position coincident with the image a conjugate function to cancel the effect of the dispersion medium 15.

The reconstructing method illustrated in FIG. 3 has many advantages in certain circumstances but has disadvantages as well. In order to cancel the effect of the dispersion medium 15 used in constructing the hologram 17', the optical system represented by the lens 37 must be of extremely high quality to transfer the image 15' of the dispersion medium into its conjugate dispersion medium 15*. At this imaging deviates from perfection, the effect of the dispersion medium 15 will not be cancelled completely. However, aberrations in the optical system represented by the lens 37 may be corrected by positioning a hologram in the diffracted beam 35 prior to the position occupied by the conjugate dispersion medium 15*. This hologram is constructed of a wavefront passed through the optical system represented by the optical system 37 and thereby when used in conjunction with this optical system cancels out its aberrations and distortions. Such a use of a hologram is described in some detail by Leith et al., in *Applied Optics*, 5, 589 (1966). When this correction is made, the wave front 39 corresponds to the object information carrying wave front 14 produced by the object in FIG. 1 except that it has been altered somewhat by the data reduction process. The lens correction is useful but may be inconvenient in certain circumstances.

Figure 4:
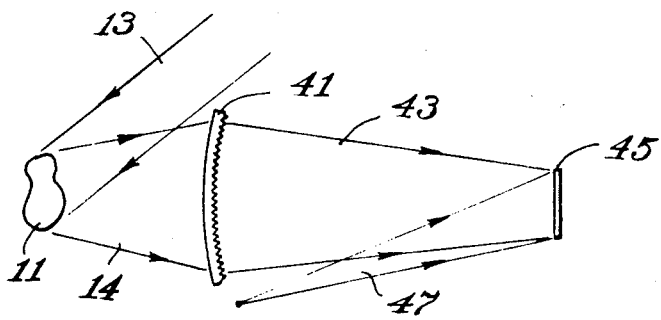
FIGS. 4 and 5 show the construction and reconstruction, respectively, of a data-reduced hologram by an alternate technique for reconstructing an orthoscopic image of an object.
Figure 5:
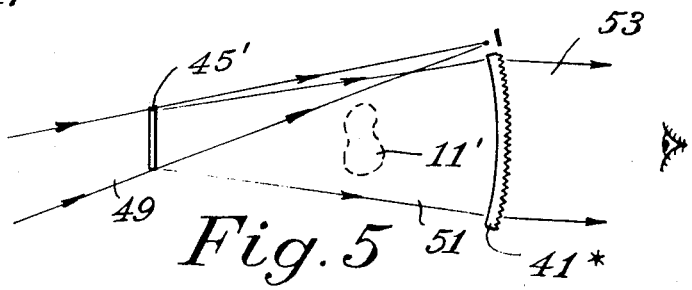

Another method for producing an orthoscopic image of the object 11 is shown in FIGS. 4 and 5. Referring to FIG. 4, the object 11 is illuminated with a coherent wavefront 13 to generate an object information carrying beam 14 which is dispersed by a dispersion medium 41. A dispersed object information carrying wavefront 43 is directed against a hologram detector 45 for interference thereon with a reference wavefront 47. The dispersive medium 41 is curved with its center of curvature approximately in the middle of the hologram 45. After processing, a hologram 45' is reconstructed as illustrated in FIG. 5. A reconstructing light beam 49 illuminates the hologram 45' from the same side which was illuminated during the construction thereof but with a wavefront the conjugate of the reference wavefront 47 used in constructing the hologram. A diffracted beam 51 forms an orthoscopic image of the dispersion medium 41, and a dispersion medium 41* is placed coincident therewith. The dispersion medium 41* is the conjugate of the dispersion medium 41 used in constructing the hologram. The wavefront 53 emerging from the diffusion medium 41* is the data-reduced version of the object information carrying wavefront 14 in which an orthoscopic image 11' of the object 11 is formed in a position to appear to be behind the dispersion medium 41*. The technique described with respect to FIGS. 4 and 5, has many applications but suffers from a disadvantage that curved dispersion mediums are difficult to accurately produce as conjugates of one another.

Figure 6:
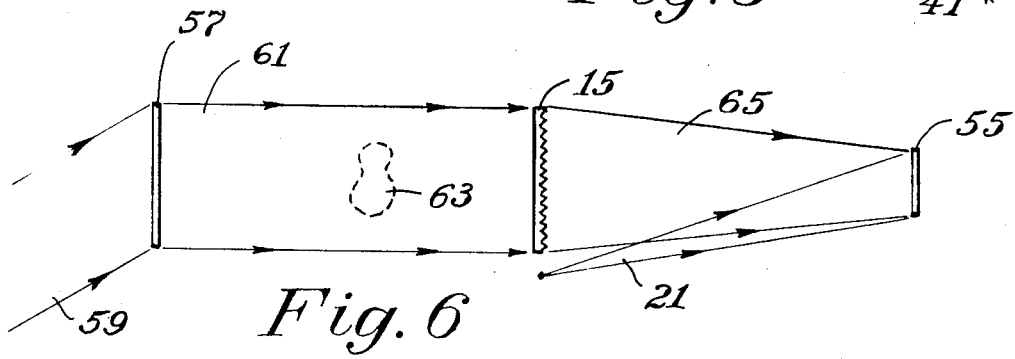
FIG. 6 illustrates the construction of a second hologram from a first hologram in the reconstruction of an orthoscopic image of an object.

Another method for constructing a data-reduced hologram capable of reconstructing an orthoscopic image is shown in FIG. 6. A hologram 55 is constructed in a manner similar to that described with respect to FIG. 1 except that the wave front recorded is not obtained from an object directly but rather as a reconstruction from a hologram 57 that is constructed according to ordinary techniques. The hologram 57 is reconstructed by an illumination beam 59 in a manner to generate a conjugate diffracted wavefront 61 in which a pseudoscopic image 63 is formed of the original object of the hologram 57. This diffracted wavefront 61 is incident upon the dispersive medium 15 which forms a dispersed beam 65 for interference with a reference beam 21 at a hologram detector 55. Images from a hologram 55' are reconstructed according to the techniques of FIG. 2 wherein the hologram 55' is substituted for the hologram 17'. An orthoscopic image of the original object is thereby obtained.

Figure 7:
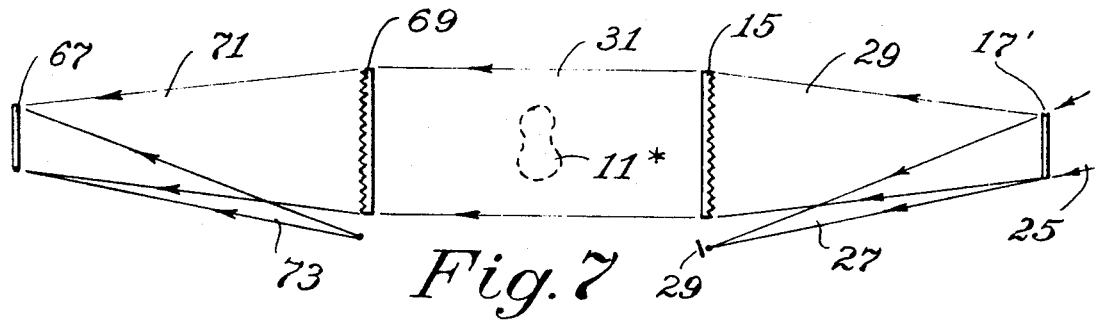
FIGS. 7 and 8 show yet another technique for constructing and reconstructing, respectively, a data-reduced hologram capable of reconstructing an orthoscopic image of an object.

In the method of FIG. 6, the initial hologram 57 must be at least as large an area as the dispersive medium 15 in order to capture information of the original object with the field of view desired in the reconstruction from the hologram 55'. This may be a disadvantage in certain circumstances. Therefore, a technique wherein two data-reduced holograms are produced as illustrated with respect to FIGS. 7 and 8. A hologram 17' is constructed as described hereinabove with respect to FIG. 1. Referring to FIG. 7, the hologram 17' is reconstructed in a manner similar to that discussed with respect to FIG. 2 to form a pseudoscopic image 11* of the object 11. The technique shown in FIG. 7, however, contemplates construction of a second hologram on a photosensitive detector 67 from the wavefront 31 which is dispersed by a dispersion medium 69 which may be similar to or different from the dispersion medium 15. A dispersed beam 71 is recorded on the hologram detector 67 upon interference with a reference beam 73. The reference beam 73 and the reconstructing beam 25 must be coherent with each other and are most conveniently derived from a common laser source (not shown) by standard optical techniques. As discussed hereinabove, the wavefront 31 is a data-reduced replica of the object information wavefront 14. The wavefront 31 is the one ultimately desired to be reconstructed except that it is traveling in the wrong direction to be able to form an orthoscopic image of the object.

Figure 8:
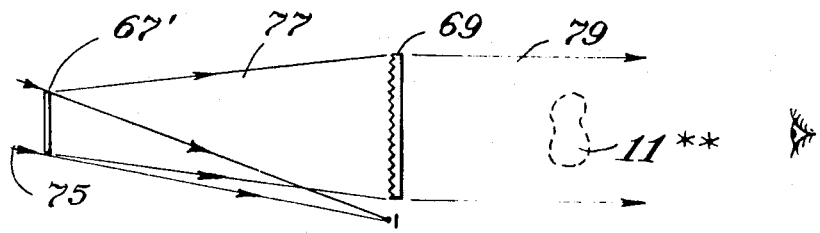

By constructing a second hologram 67' according to FIG. 7, the wavefront 31 may be turned around in order to reconstruct the desired orthoscopic image of the object if the second hologram 67' is reconstructed as shown in FIG. 8. The hologram 67' is illuminated with a reconstructing beam 75 from the opposite side of the hologram from that illuminated during its construction. The reconstructing beam 75 additionally has an opposite curvature of the reference beam 73 used in its construction. By this method of illumination, a pseudoscopic image of the dispersion medium 69 is formed in a diffracted light beam 77. The wavefront of the diffracted beam 77 is a conjugate of the wavefront 71 recorded on the second hologram 67'. The dispersion medium 69 is repositioned coincident with this pseudoscopic image in the beam 29 thereby removing the effect of the dispersion medium 69 in reconstructing an image-carrying wavefront 79 in which an orthoscopic image 11** of the object 11 is formed for viewing. The image-carrying wavefront 79 is a reconstruction of the object information carrying wavefront 14 and traveling in the same direction. Both the initial hologram 17' and the second hologram 67' constructed in carrying out this process may both be of a dimension significantly smaller than that required for reconstructing an image with the desired viewing angle by basic off-axis holography techniques. However, a deterioration of the final reconstructed image is experienced without an accompanying reduction in the stored data on the second hologram 67' by such data reduction at two different planes.

Figure 9:
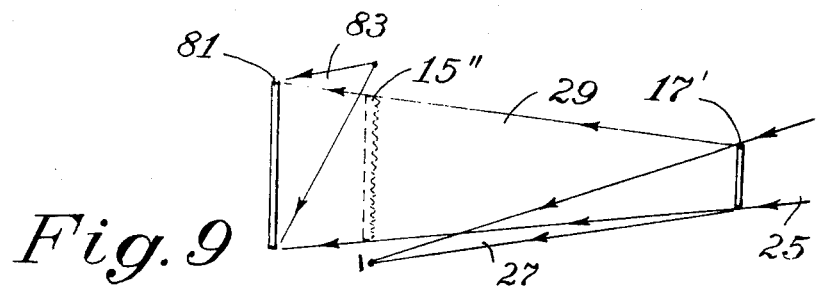
FIGS. 9 and 10 illustrate one form of the optimum embodiment of the present invention wherein a copy hologram is constructed and reconstructed, respectively, in order to reconstruct an orthoscopic image of an object.

To eliminate this double information sampling, it has been found that in the step of making a second hologram from the information reconstructed from the first hologram the dispersion medium need not be positioned between the two holograms but rather need be utilized only upon reconstruction of the second hologram. These principles are illustrated with respect to FIGS. 9 and 10. Referring to FIG. 9, the hologram 17' constructed of an object 11 according to the method of FIG. 1 is reconstructed as shown in FIG. 2 to form the information-carrying diffracted beam 29. A pseudoscopic image 15'' is formed in the diffracted beam 29 of the dispersion medium 15 used in constructing the hologram 17'. Instead of cancelling out the effect of the dispersion medium 15 by positioning said medium coincident with its pseudoscopic image 15'', a second hologram is constructed utilizing the diffracted beam 29 as its information-carrying wavefront to be recorded. A photosensitive hologram detector 81 is positioned within the diffracted beam 29 downstream of the dispersive medium image 15''. A reference beam 83 is also directed against the photosensitive detector 81 to interfere with the diffracted beam 29 and thereby to record the information of said beam holographically.

Figure 10:
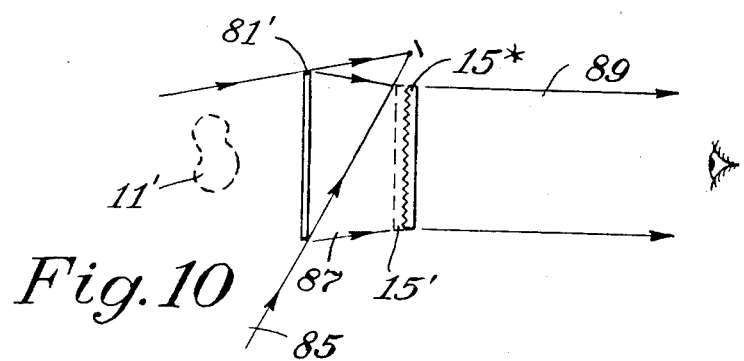

Referring to FIG. 10, a hologram 81' constructed according to FIG. 9 is reconstructed by illuminating the side opposite to that illuminated during its construction with a reconstructing beam 85 that has the opposite curvature of the reference beam 83 used during its construction. An information-carrying beam 87 that is the conjugate of the wavefront recorded is diffracted by the hologram 81' in which an orthoscopic image 15' of the dispersion medium 15 is formed. A dispersion medium 15*, which is a phase conjugate of the dispersion medium 15 used in initially constructing the hologram 17', is positioned in the diffracted beam 87 to cancel out the effect of the dispersion medium 15. If the dispersion medium 15 id refracting by virtue of one side of a glass or plastic sheet being deformed in some manner, its conjugate dispersion medium 15* is constructed of similar material and has a surface which is the impression of the surface of the dispersion medium 15. The conjugate dispersion medium 15* is aligned so that its deformed surface follows exactly the deformed surface of the reconstructed actual image 15' of the dispersion medium 15.

A wavefront 89 leaves the dispersion plate 15* in which an orthoscopic image 11' of the object 11 may be viewed. The wavefront of the light beam 89 is the same as the object information carrying beam 14 except that it contains less information because of the sampling process brought about by the data reduction. There is less loss of information, however, than in the reconstructed beam 79 of FIG. 8 since the sampling has occurred only once throughout the process of constructing two holograms and reconstructing an orthoscopic image of the original object. The purpose of the second hologram 81' is to produce the conjugate of the wavefront 29 and thereby convert the pseudoscopic image information of the diffracted beam 29 into an orthoscopic image information carrying diffracted beam 89. The photosensitive hologram detector 81 of FIG. 9 may be placed anywhere to the left (downstream) of the dispersion medium image 15''. The exact position may be dictated by practical optical geometry problems.

Regardless of the position of the photosensitive detector 81 of FIG. 9, it must be at least as large as the dispersion medium 15 used in constructing the first hologram 17'. This is a disadvantage for certain applications wherein a copy hologram is desired to be constructed with about the same area as the first hologram 17'. The principles discussed with respect to FIGS. 9 and 10 are applied in a modification thereof shown in FIGS. 11 and 12. The disadvantages of the techniques of FIGS. 9 and 10 are overcome by the modifications described hereinafter as are those features of the techniques described with respect to FIGS. 3–8 hereinabove which are disadvantages for certain applications. These improvements are incorporated into what appears to be the preferred embodiment of the present invention for most data-reducing applications. As described hereinafter with respect to FIGS. 11–12, an optical system is utilized for roughly imaging, in the step of constructing a second hologram, the first hologram into this second hologram. The use of such additional optical elements is usually avoided in holography because of aberrations introduced thereby but it has been found that by using the same lens in a later step in the process of producing an orthoscopic image of the object, imperfections in the wave fronts caused by the lens are cancelled.

Figure 11:
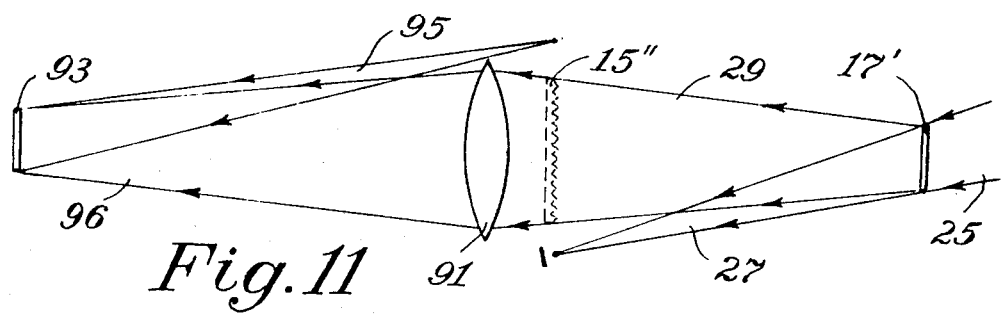
FIGS. 11 and 12 illustrate an optimum embodiment of constructing and reconstructing, respectively, a second data-reduced hologram capable of reconstructing an orthoscopic image of an object.

Referring to FIG. 11, a hologram 17' constructed according to the method of FIG. 1 is reconstructed generally according to the method of FIG. 2 except that no dispersion plate is inserted in the diffracted beam 29. An image 15'' of the dispersion medium 15 is formed in the diffracted beam 29. An optical system, represented by a single lens 91, is positioned within the diffracted beam 29 downstream of the dispersion medium image 15''. The function of the optical system 91 is generally to image the hologram 17' into a photosensitive hologram detector 93 to form a second hologram. The detector 93 is also illuminated by a reference beam 95 which is coherent with the reconstructing beam 25 and preferably derived from a common laser source (not shown). The reference beam 95 together with a wavefront 96 at the detector 93 generates an interference pattern. The optical system 91, however, need not be a perfect imaging lens since its effect is removed during reconstruction of the second hologram. The optical system 91 really need only serve as a means for gathering light diffracted by the hologram 17 into a second hologram aperture in which the detector 93 is positioned.

Figure 12:
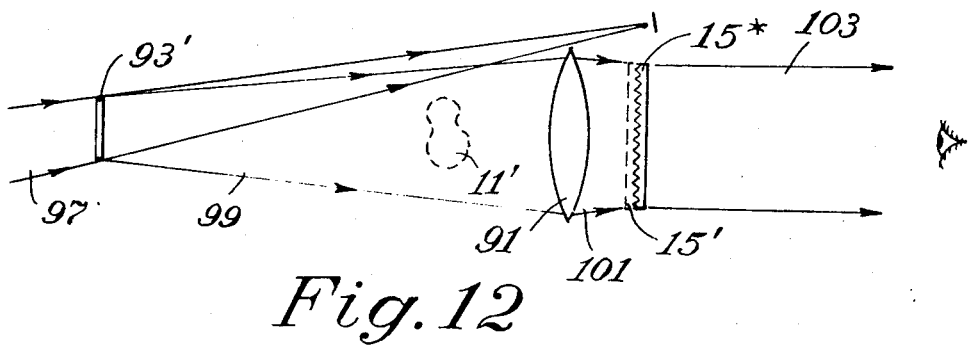

Referring to FIG. 12, a hologram 93' constructed according to FIG. 11 is reconstructed by illumination with a reconstructed beam 97 at its side opposite to the side illuminated during construction of the hologram. The reconstructing beam 97 additionally is given a wavefront curvature opposite to that of the reference beam 95. An information-carrying beam 99 that is the conjugate of the recorded wavefront 96 is diffracted by the hologram 93' and is passed back through the optical system 91 in opposite direction to that which the diffracted beam 29 passed during the construction of the hologram 93'. Additionally, the optical system elements 91 all bear the same position relative to the hologram 93' as they did to the hologram detector 93 during the hologram construction. A wavefront 101 emerging from the optical system 91 brings to focus an orthoscopic image 15' of the dispersion medium 15 utilized in constructing the first hologram 17'. As was discussed with respect to FIG. 10, a conjugate dispersion medium 15* is positioned relative to the image 15' to cancel out the effect of the use of the dispersion medium 15, thereby to form a wavefront 103 in which an orthoscopic image 11' of the original object 11 may be observed. The wavefront 103 of FIG. 12 has substantially the same characteristics as the wavefront 89 of FIG. 10.

It should be noted that the specific embodiments of the invention described herein call for the same optical system used in constructing a hologram, such as the lens 91 of FIGS. 11–12, to be replaced during the hologram reconstruction. However, an optical system so utilized will not introduce distortions into a reconstructed image if it has the same characteristics as that used in constructing the hologram, even though two different systems be employed.

Figure 13:
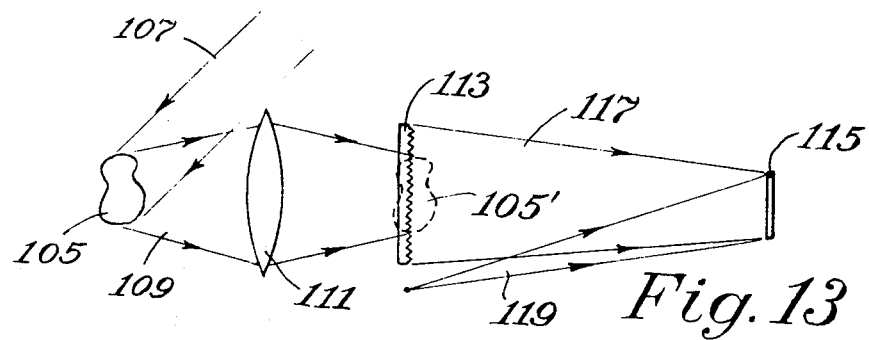
FIGS. 13 and 14 illustrate methods of constructing and reconstructing, respectively, a data-reduced hologram with a modification of FIGS. 11-12.
Figure 14:
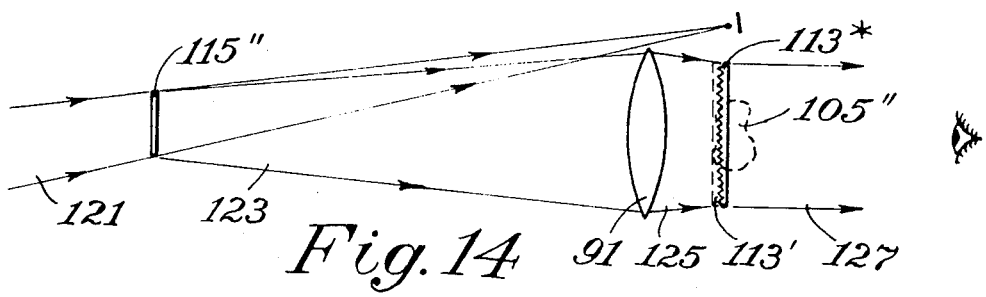

A modification of the techniques illustrated with respect to FIGS. 11 and 12 is shown in FIGS. 13 and 14 and have advantages in certain applications. Referring to FIG. 13, an object 105 to be recorded is illuminated with a coherent light beam 107 to produce an object information carrying beam 109. This information carrying beam 109 is imaged by an optical system, represented by the lens 111, to form an image 105' of the object. A preferred optical system may be a unit telescopic system for which no distortion is imparted to the image. A dispersion medium 113 is positioned coincident in space with the image 105'. The dispersion medium 113 has similar characteristics to those discussed hereinabove with respect to the dispersion medium 15. A photosensitive hologram detector 115 is positioned to receive a portion of a dispersed wavefront 117. A reference beam 119 is also directed against the detector 115 to provide an interference pattern for recordation upon the detector 115.

A second hologram is constructed from the hologram 115 by the technique illustrated in FIG. 1 wherein the hologram 115 is substituted for the hologram 17'. A second hologram 115'' would be constructed according to that technique in place of the hologram 93'. Referring to FIG. 14, the second hologram 115'' is illuminated with a reconstructing beam 121 which is the counterpart of the reconstructing beam 97 of FIG. 12. An information-carrying beam 123 is diffracted by the second hologram 115'' and passed back through the optical system 91 in the same manner that the diffracted beam 99 was passed through that system in FIG. 12. An orthoscopic image 113' of the dispersion medium 113 is formed in a wavefront 125 leaving the optical system 91. A dispersive medium 113* which is the conjugate of the dispersive medium 113 is positioned relative to the image 113' to produce a wavefront 127 in which an orthoscopic image 105'' may be viewed. Notice that by use of the imaging lens 111 in constructing the hologram according to FIG. 13, an image 105'' is formed in the wavefront 127 which appears in space to be passing through the dispersion medium 113*. The position of the reconstructed orthoscopic image 105'' is controlled by the positioning of the image 105' of FIG. 13 by the optical system 111. As the image 105' is moved to the right in FIG. 13, the reconstructed image 105'' will appear to be located further to the right in FIG. 14.

There are further advantages of using an imaging system 111 as described with respect to FIGS. 13 and 14. When the image 105' is placed in or near the dispersion medium 113, as shown in FIG. 13, the dispersion medium may have a smaller area for constructing a hologram capable of reconstructing an image with the same viewing angle as accomplished in the other embodiments described previously wherein the object was not imaged into the dispersion medium. Additionally, the technique of imaging by an optical system 111 makes it less critical in repositioning the dispersion medium 113* upon reconstruction of an image according to FIG. 14. However, the optical system represented by the lens 111 must have a very wide aperture and must be of high enough quality to avoid introducing unwanted distortions into the system. Any imperfections of the imaging system 111 are not cancelled out by a subsequent step, as are the imperfections introduced into a wavefront by the optical system 91.

The technique described with respect to FIGS. 13 and 14 is not restricted to placing the object image 105' in or near the plane of the dispersive medium 113. The final image 105'' may be arranged to appear at any plane with respect to the dispersion medium 113* by selecting an appropriate lens system 111.

Figure 15:
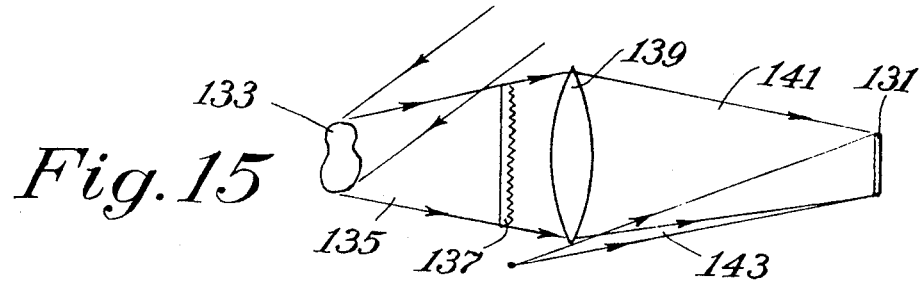
FIGS. 15, 16 and 17 show the construction of a first hologram, construction of a second hologram, and the reconstruction of an orthoscopic image from the second hologram, respectively, with the use of a light-gathering lens.
Figure 16:
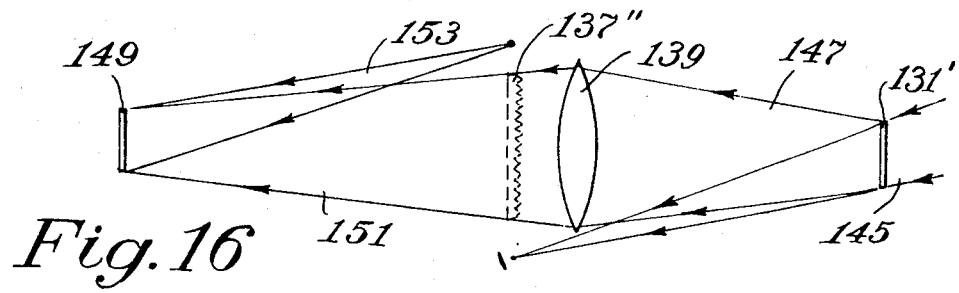
Figure 17:
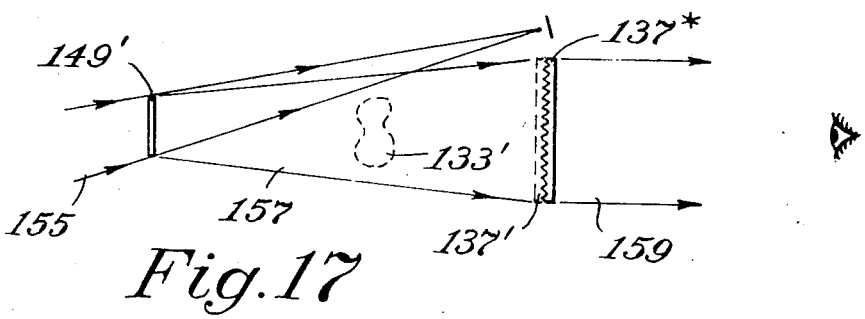

A modification of the holographic construction and reconstruction techniques discussed with respect to FIGS. 11 and 12 is described with respect to FIGS. 15–17. As part of this modification, an optical system is positioned differently than heretofore which results in convenience for certain applications and additionally allows the optical system to perform various other functions. The optical system is added in a manner that any aberrations imparted thereby to the wavefronts passing therethrough may be removed by use of the same lens in a subsequent step. Referring to FIG. 15, a hologram 131' is constructed of an object 133. An object-information carrying beam 135 is dispersed by a dispersion medium 137 and then passed through an optical system represented by a lens 139 to form a controlled dispersed beam 141. A photosensitive hologram detector 131 is positioned in the path of the beam 141 for recording it. A reference beam 143 interferes with a controlled dispersed information-carrying beam 141 to form a diffraction pattern which is recorded on the detector 131.

The first hologram 131' is reconstructed according to FIG. 16 wherein a reconstructing light beam 145 strikes the hologram 131' on its side opposite to that illuminated during the construction thereof. The curvature of the reconstructing beam 145 is made opposite to that of the reference beam 143 in order to produce a diffracted beam 147 which is the conjugate of the controlled dispersed beam 141 recorded on the hologram. The diffracted beam 147 is passed back through the optical system 139 with all elements positioned relative to the hologram 131' as they were to the hologram detector 131. A pseudoscopic image 137'' of the dispersion medium 137 is formed in the diffracted beam 147 after passing through the optical system 139. A second photosensitive hologram detector 149 is positioned in an information-carrying beam 151. The beam 151 is that portion of the diffracted beam 147 downstream of the image 137'' of the dispersion medium. A reference beam 153, coherent with the reconstructing beam 145, illuminates the detector 149 to form thereon a diffraction pattern which becomes the hologram.

Referring to FIG. 17, a second hologram 149' constructed according to FIG. 16 is reconstructed by illumination with a coherent reconstructing light beam 155 from its side opposite to that illuminated during its construction. A reconstructing beam 155 has a curvature opposite to that of the reference beam 153 used during the hologram construction so that a diffracted beam 157 reconstructed therefrom is the conjugate of the wavefront 151 recorded thereon. An actual image 137' of the dispersion medium 137 is formed in real space within the diffracted beam 157. A dispersion medium 137* which is the conjugate of the dispersion medium 137 is positioned alongside the dispersion medium image 137' to cancel information of the dispersion medium from the diffracted beam 157, thereby to from a beam 159 in which an orthoscopic image 133' of the object 133 may be viewed.

The optical system 139 shown in FIGS. 15 and 16 may be designed to perform the same function as the optical system 91 described hereinabove with respect to FIGS. 11 and 12. That is, the optical system 139 is designed to gather light diffracted from the first hologram 131' onto a second small hologram detector 149, as shown in FIG. 16. The advantage to this alternate technique is that a lens system is not necessary during the final reconstruction of an orthoscopic image, as shown in FIG. 17.

Alternatively, the lens system 139 of FIGS. 15 and 16 may be designed and positioned relative to the other elements to gather light onto the first hologram detector 131 in FIG. 15. More specifically, according to this alternative, the lens system 139 is designed to image a plane of the object 133 onto the hologram detector 131 in the absence of the dispersive medium 137. This would help the dispersion medium 137 in bending its scattered light onto the detector 131. However, since in many applications it may be difficult for the optical system 139 to be properly designed for both gathering light onto the first hologram detector 131 during its construction and also to gather light onto the second hologram detector 149 during its construction, it may be desirable to combine these techniques with those discussed with respect to FIGS. 11 and 12. That is, the optical system 139 is designed for adequately gathering light onto the first hologram detector 131 while a second optical system, similar to the optical system 91 of FIGS. 11 and 12, is positioned in the beam 151 of FIG. 16. This second lens system is designed to cooperate with the optical system 139 in order to properly gather light onto the second hologram detector 149. This added lens is then used in the reconstruction step of FIG. 17 by positioning it in the reconstructed diffracted beam 157.

Figure 18:
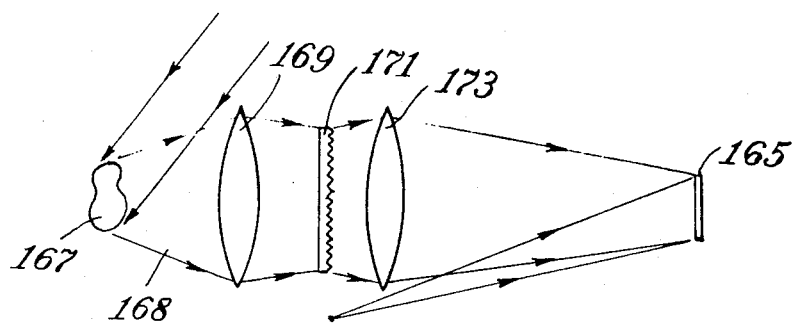
FIGS. 18, 19 and 20 illustrate an alternative use of a light-gathering lens in practicing the present invention.
Figure 19:
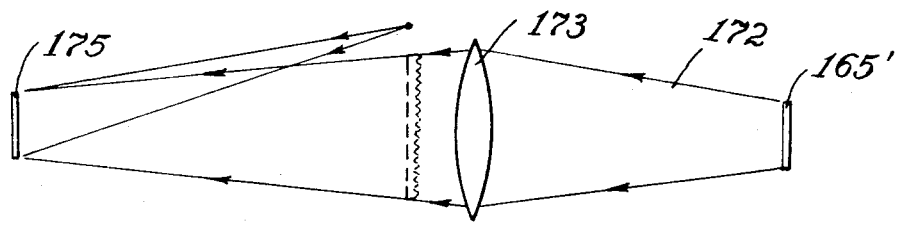
Figure 20:
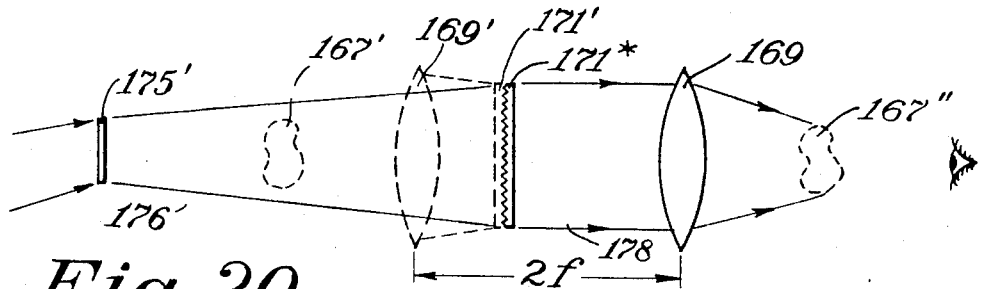

Another modification of embodiments of the invention described so far is shown with respect to FIGS. 18–20 wherein two lenses are utilized in the construction of the initial hologram. Referring to FIG. 18, a first hologram 165 is constructed of an object 167 by passing an object-modified coherent light beam 168 through an optical system 169, a dispersion medium 171, and a second optical system 173. Referring to FIG. 19, a second hologram 175 is constructed of a conjugate wavefront 172 reconstructed from the first hologram 165' after passing back through the optical system 173 in a direction opposite to the direction of light travel therethrough in constructing the hologram 165' according to FIG. 18. Any distortions introduced by the lens system 173 during construction of the first hologram 165 are thereby eliminated, as discussed hereinabove with respect to FIGS. 15–17.

Referring to FIG. 20, the second hologram 175' has a wavefront 176 reconstructed therefrom that is a conjugate of the wavefront recorded thereon. A dispersion medium 171* is a conjugate of the dispersion medium 171 and is positioned coincident with a real space image 171' of the dispersion medium 171. An image 167' of the object may be viewed directly in the beam 178 in an apparent position behind an image 169' of the lens 169. However, some optical system may be desired in FIG. 20 to cooperate with the lens 169 on the reconstructed wavefront 178. One technique is to position in the reconstructed beam 178 on a lens of opposite curvature to that of the lens 169. Another technique, shown in FIG. 20, includes repositioning the lens 169 in the reconstructed beam 178 to form a unit telescope which transfers the image 167' into a real space image 167''. It will be noted from FIG. 20 that the lens 169 cannot simply be positioned coincident with its image 169' because the image is not formed in real space.

The optical systems represented by the lenses 169 and 173 of FIGS. 18–20 are cooperatively designed and positioned. For instance, the optical system 173 is chosen to image the first hologram 165' of FIG. 19 approximately onto the second hologram 175. The optical system 169 is then cooperatively designed and positioned so that a combination of the optical systems 169 and 173 of FIG. 18 image a plane of the object 167 onto the hologram detector 165 in the absence of the dispersion medium 171.

Many other combinations of lenses for other particular purposes will become apparent in the practicing of the invention herein in its various aspects. A particular combination found to have favorable properties when used in conjunction with a strictly periodically varying structure utilizes in addition to the lenses shown in FIGS. 18 to 20 an additional lens corresponding to lens 91 of FIGS. 11 and 12. The lenses 91 and 173 in such a combination are selected so that the overage rays collected by the holograms 165 and 175 are passed through the dispersion structures 171 and 171* normal thereto, thereby providing reconstructed images into which light is diffracted equally well from all portions of the dispersion structures.

The dispersion media described for use herein may be any one of several known light scatterers. It has been found preferable, however, to use a diffusion screen such as glass with one side thereof ground. Such diffusion glass is readily available with various random-phase-varying characteristics. However, it is preferred to construct a dispersion medium with particular characteristics for the application intended by molding a transparent plastic to have a controlled deformed surface. For most applications, a dispersion structure having a periodic phase variation thereacross is preferred. Once a dispersion medium with desired characteristics is constructed, its conjugate may be formed by taking the impression of the surface of the first dispersion medium. However, a conjugate of certain periodic structures such as that illustrated in FIG. 21 may be obtained by displacing the original dispersion medium laterally by one-half the surface variation period.

Figure 21:
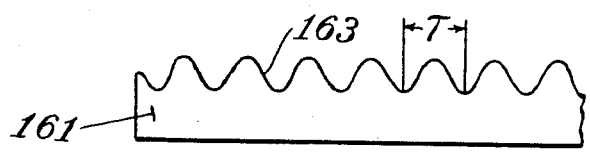
FIG. 21 shows in cross section a dispersion structure for use with the techniques of the present invention.

A primary advantage of a periodically varying phase structure is that it is easier to align during reconstruction with its own image for decoding the object signal. An example of a periodic phase dispersion structure is shown in FIG. 21 in cross section. A sheet of glass 161, or other light-refracting medium such as plastic, has one surface 163 thereof formed by etching or molding into a periodically varying surface with a period $\tau$. Such a variation may be a sinusoidal one and give good results. A more ideal surface is a parabolically varying one. The parabolic surface is ideal since light is refracted equally in all directions over a desired cone angle and, therefore, there is better intensity distribution across a reconstructed image. Furthermore, image brightness is increased by concentrating the intensity of the refracted light into a desired cone angle.

Furthermore, a periodic phase structure allows elimination of a spotty composition of the image which is characteristic to some degree of the use of dispersion mediums, as herein. A dispersion structure with a randomly varying surface thereacross has a random spotty image which may be minimized by moving the dispersive medium and the hologram during reconstruction of an image in a rapid and random manner. However, a periodic structure allows elimination of the spottiness upon vibrating the dispersive medium and the hologram upon reconstruction of an image therefrom in a square or other predetermined periodic pattern which spreads out the apparent image of the spots to blur them into a single slightly enlarged spot of uniform intensity.

Figure 22:
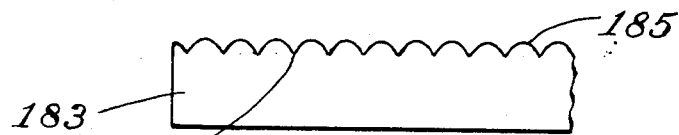
FIG. 22 shows in cross section a modification of the dispersion structure of FIG. 21.

A dispersion medium with such a surface variation as described with respect to FIG. 21 is sensitive to misalignment on wavefront reconstruction from a data-reduced hologram. Two images are formed after refraction by the dispersion medium and these images may not coincide if the dispersion medium is not properly aligned. Less precision in alignment is required when a refracting dispersion medium 183 of FIG. 22 is employed. Its periodically varying surface 185 preferably follows a parabolic shape. The sharp change in slope at the joining of two parabolas such as at the point 187 of FIG. 22, is generally undesirable because of light scattering over wide angles. Therefore, such points of juncture are made opaque with the opaque areas gradually changing into transmittive areas in a manner to prevent unwanted light diffraction by sharp changes in transmission.

Throughout the description herein, transmissive types of dispersion media have been employed but it should be understood that reflected dispersive media may be preferred in certain circumstances. The principles employing reflective dispersive media are the same as those described herein.

What is claimed is:

1. A method of holographically reconstructing an orthoscopic image of an object, comprising the steps of:
   constructing a first hologram by interfering a reference radiation beam and an object-modified radiation beam at a first detector, said object-modified beam being dispersed across a given surface thereof prior to striking said detector,
   reconstructing from said first hologram a wavefront that is the conjugate of said dispersed object-modified radiation beam in a manner to reconstruct a pseudoscopic image of said dispersion function in real space,
   constructing a second hologram of said conjugate dispersed object-modified beam by interfering reference radiation therewith at a second detector positioned therein downstream of said dispersion function image,
   reconstructing from said second hologram a wavefront that is the conjugate of the wavefront recorded thereon and which forms an actual image of said dispersion function in real space, and
   dispersing the beam reconstructed from the second hologram at the actual image of said dispersion function by a function that is a phase conjugate of said dispersion function.

2. The method as defined in claim 1 wherein the step of constructing a second hologram is accomplished without dispersing the conjugate of the modified beam reconstructed from the first hologram.

3. The method as defined in claim 1 wherein the step of constructing the first hologram includes positioning the dispersion surface within the object-modified beam so that a space-spatial frequency product of an interference pattern recorded on the first hologram is less than said product would be if the object-modified beam were recorded as a hologram at the dispersion surface.

4. The method as defined by claim 1 wherein a high-quality imaging lens is positioned within the object-modified radiation beam to image said object into the surface across said beam wherein the dispersion function is positioned.

5. The method as defined by claim 1 wherein the step of constructing a second hologram includes the step of positioning a lens element within said conjugate object-modified beam between the second detector and the dispersion function pseudoscopic image, and wherein the step of reconstructing a wavefront from the second hologram includes the step of repositioning said lens element within the wavefront reconstructed from the second hologram between the second hologram and said dispersion function actual image, said lens element being located the same distance from the second hologram in both the second hologram construction and reconstruction steps.

6. The method as defined by claim 5 wherein said lens element is positioned during the step of constructing the second hologram to image the first hologram onto the second detector.

7. The method as defined in claim 1 wherein the step of constructing the first hologram includes the steps of positioning in the dispersed object-modified beam a lens element located between said surface upon which said beam is dispersed and said first detector, and wherein the step of reconstructing a wavefront from said first hologram includes the step of repositioning said lens between said first hologram and said real space reconstructed pseudoscopic image of the dispersion function, said lens element being located the same distance from the first hologram in both the first hologram construction and reconstruction steps.

8. The method as defined in claim 7 wherein said lens element is designed and positioned in the step of constructing the first hologram to image the object onto the first detector in the absence of dispersing said object-modified beam.

9. The method as defined in claim 7 wherein said lens element is designed and positioned in the step of constructing the first hologram to cooperate with another lens positioned between said object and the surface upon which said beam is dispersed to image the object onto the first detector in the absence of dispersing said object-modified beam.

10. The method as defined in claim 1 wherein the object-modified beam is dispersed across a given surface thereof by positioning across said surface a dispersing medium having a periodically varying phase function thereacross.

11. In the method of making a hologram by interfering an object information carrying beam with a reference beam at a finite angle to form an interference fringe pattern that is recorded on a hologram detector, the improvement wherein a dispersion plate having periodically varying surface undulation of a parabolic shape is positioned across the path of said object information carrying beam prior to its striking said detector.

12. The method according to claim 11 wherein the periodically varying surface undulations include a large number of parabolic surfaces, each surface joining those surrounding it with an abrupt change in slope.

* * * * *